(12) United States Patent
Schilling et al.

(10) Patent No.: US 7,876,709 B2
(45) Date of Patent: Jan. 25, 2011

(54) MESH NETWORK COMMUNICATION SYSTEMS AND METHODS

(76) Inventors: Donald L. Schilling, 13046 Radon Dr., Palm Beach Gardens, FL (US) 33410; Joseph Garodnick, 56 Wild Goose Way, Centerville, MA (US) 02632

( * ) Notice: Subject to any disclaimer, the term of this patent is extended or adjusted under 35 U.S.C. 154(b) by 626 days.

(21) Appl. No.: 11/973,305

(22) Filed: Oct. 5, 2007

(65) Prior Publication Data
US 2009/0092143 A1  Apr. 9, 2009

(51) Int. Cl.
*H04L 12/28* (2006.01)
(52) U.S. Cl. .................... 370/254; 370/328; 370/338
(58) Field of Classification Search ............. 370/254, 370/328, 331, 338
See application file for complete search history.

(56) References Cited

U.S. PATENT DOCUMENTS

| | | | |
|---|---|---|---|
| 6,985,456 B2 * | 1/2006 | Gaskill et al. ............... 370/318 |
| 7,016,328 B2 | 3/2006 | Chari et al. |
| 7,050,819 B2 | 5/2006 | Schwengler et al. |
| 7,085,241 B1 | 8/2006 | O'Neill et al. |
| 7,376,091 B1 * | 5/2008 | Eccles et al. ................ 370/265 |
| 7,697,508 B2 * | 4/2010 | Hernandez-Mondragon et al. ........................ 370/352 |
| 2004/0192306 A1 * | 9/2004 | Elkarat et al. ............ 455/435.2 |
| 2007/0070959 A1 * | 3/2007 | Almeroth et al. ............ 370/338 |

OTHER PUBLICATIONS

White Paper, Cisco Mobile IP, Cisco Systems, Inc., Copyright © 1992-2001, 8 pages.

* cited by examiner

*Primary Examiner*—Jayanti K Patel
*Assistant Examiner*—Jung Park

(57) ABSTRACT

A mesh network communication system including one or more mesh networks and a plurality of remote subscriber users employing wireless, spread spectrum type communications for communicating with an access node in one of the mesh networks. The remote subscriber units can be mobile and can use handover to change nodes within a mesh network without a disruption of communication. The system and methods determine the location of a remote subscriber unit in a mesh network by the remote subscriber unit providing the access node with its home address and ID such that if the access node is not the home node, the home node is notified of the visiting node address such that the home node always knows the location of any remote subscriber unit based at the home node. Accordingly, communication between remote subscriber units where one of the remote subscriber units is not currently located at its home node can be accomplished without using the home node.

18 Claims, 13 Drawing Sheets

MESH NETWORK COMMUNICATION SYSTEMS AND METHODS

BACKGROUND OF THE INVENTION

1. Field of the Invention

The present invention pertains to mesh network communication systems and methods and, more particularly, to determining the location of a remote subscriber unit in a mesh network to permit communication between remote subscriber units in an efficient manner.

2. Brief Discussion of the Related Art

In currently employed mesh network communication systems containing remote subscriber units, each mesh remote subscriber unit is given, a priori, an address. A remote subscriber unit can enter a mesh network at any node, and use the network to communicate with any fixed user.

One problem faced in such systems is that a first remote subscriber unit, when entering a mesh network, typically would want to communicate with a second remote subscriber unit whose present location is unknown to the first remote subscriber. That is, the second remote subscriber unit may not be in the same mesh network as the first remote subscriber unit; and, even if the second remote subscriber unit is in the same mesh network, the second remote subscriber unit may not be reachable at its address. In addition, such systems as currently proposed are typically carrier sense multiple access (CSMA) systems which do not permit simultaneous access to a node. Accordingly, if one remote subscriber unit is accessing a node with a voice, or with a streaming video signal, other remote subscriber units must wait until there is a "free time interval," that is, a time period in which no remote subscriber unit is using the channel to the node, in order to access the node.

The prior art systems, as described above, do not determine the location of a remote subscriber unit in a simple and efficient manner to permit efficient and direct communication between remote subscriber units.

U.S. Pat. No. 7,016,328 to Chary et al, U.S. Pat. No. 7,050,819 to Schwengler et al and U.S. Pat. No. 7,085,241 to O'Neal et al, are representative of prior art communication systems having the disadvantages described above. The Chary et al patent discloses a mobile user accessing a mesh network where the mobile user can move from node to node during a conversation by the use of a handover procedure. When the mobile user first accesses the mesh network, the mobile user provides the entrance node with its client (ID) information. A backbone network is employed to contact the destination node at which time a communications path is set up. The Chary et al patent does not disclose how one mobile user entering a mesh network can find a second mobile user in the mesh network where each of the mobile users is at a random location, and describes a centralized flow control as opposed to node to node flow control. The Schwengler et al patent discloses a mobile user accessing a mesh network where the mobile user is detected by the mesh network and, with the use of GPS and triangularization, the physical location of the mobile user is determined. Based on the determined location of the mobile user, a transmit frequency is selected. There is no disclosure in the Schwengler et al patent as to how one mobile user can access another mobile user located in the mesh network or in another mesh network. The O'Neal et al patent describes routing techniques used to communicate with a mobile user assuming that initially a user communicating with the mobile user knows the mobiles user's address. The O'Neal et al patent does not disclose how to initially locate the mobile user or how to initiate a call to the mobile user who can be anywhere.

In a white paper, Copyright 1992-2001, Cisco Systems, Inc. describes mobile communication, referred to as Mobile IP, where a home agent (router) serves as an anchor point for communication with a mobile node, such as a cell phone, PDA or laptop, and tunnels packets from a device on the Internet to the mobile node, via the home agent; a procedure which has the disadvantage of being an inefficient use of bandwidth and time. The home agent is updated with location information periodically over a regular basis, not continually dependent on movement of the mobile node, which has the disadvantage of unnecessarily clogging the network.

In view of the above, it should be appreciated that there is a great need for a system and method for determining the location of a mesh remote subscriber unit operating in a mesh network communication system, including one or more mesh networks, to thereby allow remote subscriber units to communicate with each other when a remote subscriber unit is moving, without clogging the system.

SUMMARY OF THE INVENTION

In describing the present invention hereinafter, the following terms are used with the associated meanings set forth below: "mesh network" (often referred to as a distributed network) is well known in the art and typically includes a plurality of nodes interconnected with each other to form the distributed network; "spread spectrum type system" is a system utilizing single or multiple carrier direct sequence spread spectrum (DSSS), single or multiple carrier frequency hopping spread spectrum (FHSS), orthogonal frequency division modulation (OFDM) technologies or various hybrid combinations thereof; "remote subscriber unit (RSU)" is any mobile communication equipment with mesh network interface capability such as, for example, a cell phone, a computer, a portable digital device, or any combination device permitting voice, video, and/or any data communication; "home address or node" is the address of the node at which a remote subscriber unit typically resides, the node normally being located in the vicinity of where the remote subscriber unit spends a maximum amount of time but could be located in any area, it being noted that many remote subscriber units can reside at the same home node but that each remote subscriber unit also has a unique ID, comparable to a phone number, such that the home node is the node to which another remote subscriber unit will call to reach the first named remote subscriber unit with the home node address of a remote subscriber unit being provided to the remote subscriber unit prior to the use of the remote subscriber unit; and "visiting address or node" is the address of the node where a remote subscriber unit is currently located if not at the remote subscriber unit's home node.

A primary aspect of the present invention is to provide the home node of a remote subscriber unit in a mesh network communication system with the location of the remote subscriber unit at all times to facilitate communication therewith.

Another aspect of the present invention is to provide a mesh network communication system and method wherein a remote subscriber unit within the communication system determines the location of another remote subscriber unit in the system such that the two remote subscriber units can communicate in an efficient manner.

In another aspect, the present invention permits communication, including conference calls, between two or more remote subscriber units, after initial contact is made, without always passing through a home node and, when one of the remote subscriber units moves and communicates through a new visiting node such that handover occurs, the new visiting node informs the other remote subscriber units involved in the communication of the address of the new visiting node (address change) to permit seamless continued communication.

An additional aspect of the present invention is the use of spread spectrum type modulation for communication between nodes and remote subscriber units in a mesh network system where the location of the remote subscriber units are communicated to their respective home nodes at all times.

A further aspect of the present invention is to facilitate communication between a calling remote subscriber unit in a mesh network communication system with a called remote subscriber unit in the system, by the home node of the called remote subscriber unit informing the calling remote subscriber unit of the location of the called remote subscriber unit.

In an additional aspect, communication between a calling remote subscriber unit in a mesh network communication system with a called remote subscriber unit at a visiting node in the system is facilitated by the home node of the called remote subscriber unit forwarding calls to the called remote subscriber unit via the visiting node.

A system and method of mesh network communication according to the present invention utilizes one or more interconnected mesh networks with each mesh network containing a plurality of nodes, and a plurality of remote subscriber units which can access one or more of the mesh networks with the communication between a remote subscriber unit and a node employing a spread spectrum type modulation technique. In the mesh network communication system and method, when a remote subscriber unit is turned on, the remote subscriber unit listens for signals from nearby nodes of a local mesh network, the signals identifying the node and providing certain codes needed for the remote subscriber unit to communicate with the mesh network. The remote subscriber unit may receive signals from several such nodes and, in that case, selects a node having an appropriate power level. Each node may also, preferably, indicate the congestion present at that node due to other remote subscriber units. In this case, the remote subscriber unit selects a node which has the appropriate power level and, when such information is available, the congestion level. After selecting the node, the remote subscriber unit transmits a spread spectrum type signal, to the selected node, indicating its home address and ID. The selected visiting node sends a short packet to the remote subscriber unit's home node to inform its home node of its current address (location). Any remote subscriber unit desiring to call the visiting remote subscriber unit, calls the visiting remote subscriber unit's home address, i.e. the address of the remote subscriber unit's home node. The home node of the visiting (called) remote subscriber unit transmits the called remote subscriber unit's current address to the calling remote subscriber unit such that the location of the node to which the called remote subscriber unit is connected is established. Since the called remote subscriber unit is possibly one of several simultaneous communicators with the visiting node, the called remote subscriber unit might, in some cases, overload the visiting node if the power received by the visiting node from the called remote subscriber unit is too great. This situation is particularly common in multiple access systems. When this situation occurs, a ramp-up or sounding procedure can be employed to avoid overload, the ramp-up and sounding procedures being techniques well known in the communication industry and currently described in the 3G PP standard. The ID portion of the signal packet sent by the visiting node to the home node is of short duration. In practice, the visiting node may send the ID information in a stand-alone packet, or it may append the ID information to another packet going in the same general direction. By appending the information contained in the ID packet to another packet, much of the ID packet overhead can be omitted thereby reducing network congestion. The ID packet is sent node to node until it reaches the home node. In a preferred embodiment, node to node transmission, through the use of store and forward routing is employed, which minimizes congestion in the mesh network. Where store and forward is used, the routing of the ID packet can follow the normal routing technique employed for the transmission of normal message packets. A backhaul network is not required, it being noted that a backhaul network is inefficient in bandwidth usage as it reserves bandwidth for a specified task such that a channel may not be fully utilized. However, centralized routing is a satisfactory routing procedure. With such routing, the ID packets are each sent to respective home nodes by a central controller system. The above techniques are well known in the communications field.

Some of the advantages of the methods and systems of mesh network communication according to the present invention are that the methods and systems can be used on existing networks in that home nodes are available and can readily be programmed to convey the required information. Remote subscriber units currently being used for mesh networks, and cell phones with mesh network interface capability, already send an ID and send location information when they transmit to say, Google, in order to receive information. Any remote subscriber unit in the mesh communication network system is capable of simultaneously communicating with any grouping of remote subscriber units, no matter where such remote subscriber units are located, or whether such remote subscriber units are moving. A remote subscriber unit is permitted to access an appropriate node in a manner so as to ensure that the power level is adequate and congestion is within appropriate limits, and communication is permitted between a node and multiple remote subscriber units simultaneously accessing that same node. Further, remote subscriber units can monitor the location of other remote subscriber units as the remote subscriber units move around the world. In this aspect, GPS can be used to assist in the determination of the immediate location of a remote subscriber unit being tracked. An example of this application is a system used to monitor trucks, trains, airplanes and the like.

Various other aspects, advantages, and benefits, of the present invention will become apparent from the following description of the preferred embodiments thereof taken in conjunction with the accompanying drawings wherein like reference numerals are used to designate like or similar parts.

DETAILED DESCRIPTION OF THE INVENTION

Figure 1:
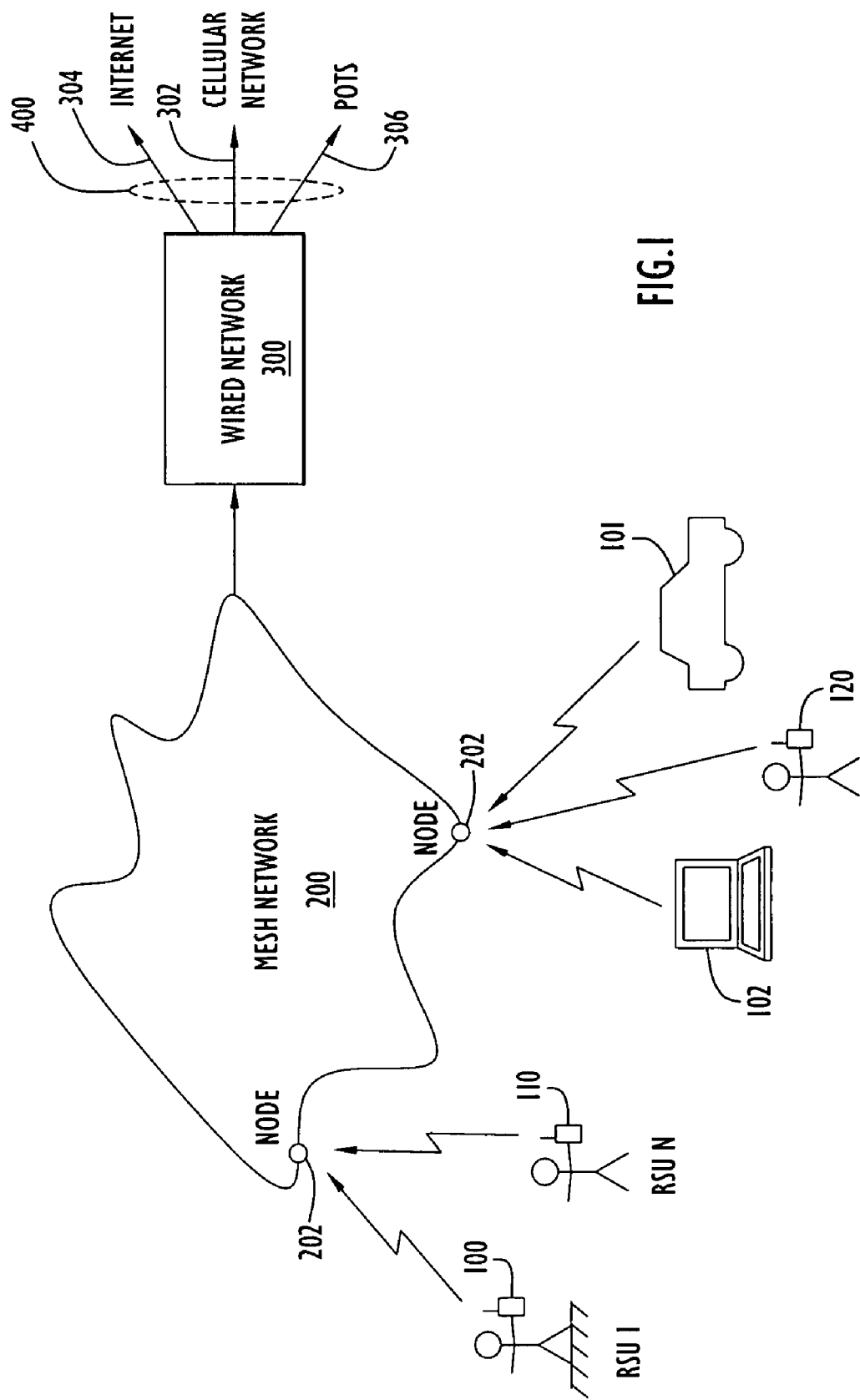
FIG. 1 is a block diagram of a mesh network with remote subscriber units in various forms.

In order to facilitate understanding of the present invention, a conventional mesh network communication system is illustrated in FIG. 1. As shown in FIG. 1, a mesh network 200 includes a plurality of access nodes 202 for use by a plurality of remote subscriber units (RSUs). RSUs are shown at 100, 101, 102, 110 and 120, it being noted that any number of RSUs can use the mesh network communication system. The RSUs can take any form; and, for example, the RSUs are shown in FIG. 1 as including mobile handheld units at 100, 110 and 120, a vehicle mounted unit shown at 101 and a portable computer shown at 102. Signals from the RSUs are transmitted in either a wireless or wired manner to the nodes of the mesh network, and the mesh network illustrated in FIG. 1 is coupled with a wired network 300 which in turn is coupled with communications systems 400, such as a cellular network 302, the Internet 304 (e.g. devices such as Ipods, Blackberrys, and the like), and a landline telephone system, often referred to as "POTS," an acronym for Plain Old Telephone System. Systems 302, 304 and 306 constitute a destination which does not initiate a call to an RSU and, initially, does not know the access node address of a calling RSU. The destination can, of course, respond to an RSU since each RSU has an address transmitted to the destination. In the system shown in FIG. 1, carrier sense multiple access (CSMA) is typically used. RSUs initiate communication (calls), and a calling RSU can usually interface and use any node in the network.

The systems and methods of the present invention are described in connection with FIG. 2, which includes mesh networks A and B having nodes A? and B? coupling mesh networks A and B, a plurality of access nodes 502 and a plurality of RSUs similar to the exemplary RSUs described in relation to the system of FIG. 1, the RSUs in mesh network A being indicated as 504, 506, 508, 510, 512 and 514 and the RSUs associated with mesh network B being indicated at 516 and 518. As will be explained hereinafter, the RSUs can call or be called by any RSU located within the same mesh network or having access to any other network coupled with the mesh network. The RSUs can be mobile during a call whether an RSU has placed a call or is being called. A basic principle employed in the systems and methods of the present invention is that the home node for an RSU knows where the RSU is located at all times. For example, the home node for RSU 1, 504, is node 1, and any calls to RSU 1 made by another RSU, not knowing RSU 1's present location, will be made to the home node of RSU 1, that is, to node 1, 504. Accordingly, in one embodiment of the present invention, the home node informs the calling RSU where RSU 1 is located or, in a second embodiment, forwards the call to RSU 1. In either embodiment, the call continues between the calling RSU and RSU 1 without requiring the use of the home node. As an RSU moves between nodes within a mesh network or from mesh network to mesh network, each visiting node sends a registration message to the home node for the RSU informing the home node of the current address for the RSU, it being noted that the systems and methods of the present invention permit seamless communication between two or more remote subscriber units thereby facilitating conference calls.

Each RSU includes a transceiver allowing the RSU to receive and transmit signals to a home or visiting access node in the mesh network. The transceiver can include multi input, multi output (MIMO) circuitry to improve transmission performance. MIMO circuitry incorporates more than one antenna at the RSU and more than one antenna at an access node. The data to be sent from the RSU is first encoded and demultiplexed to the multiple antennae in the RSU. After transmission, each signal suffers from multipath distortion in which multiple "copies" of the original signal from each of the RSU transmit antennae are received by the access node. At the access node, the multiple antennae send the signals to the appropriate demodulators where the signals are demodulated and combined. MIMO circuitry/technology is well known in the art.

The RSUs can transmit using carrier sense multiple access (CSMA) which is technology known in the art; however, CSMA does not permit two or more RSUs to access the same node at the same time. That is, the CSMA system in a RSU is used to inform that RSU if the channel is clear for transmission. If the channel appears to be clear, the RSU transmits to the node. If simultaneous access should occur, a "collision" results, and the signal packets from each RSU must be retransmitted.

As opposed to CSMA, the preferred transmission to and from each RSU and access node in accordance with the present invention employs a spread spectrum type of modulation such as a single carrier or multi-carrier, direct sequence spread spectrum (DSSS); binary or multi-carrier, frequency hopping spread spectrum (FHSS); or orthogonal frequency division modulation (OFDM). OFDM can be thought of as a multi-carrier, direct sequence code division multiple access (DS CDMA) system in which the data is demultiplexed, coded, and then first-modulated using quadrature amplitude modulation (QAM), and then second-modulated by scrambling using a pseudorandom or other sequence, without spreading the bandwidth. If, however, the sequence employed does spread the spectrum, and each remote subscriber unit uses a different sequence, the system is referred to as an OFDMA system, since multiple access is now possible, that is two or more users can access the same node simultaneously. In a standard multi-carrier code division multiple access (MC CDMA) system, the rate of the pseudorandom sequence is larger than the symbol rate and, therefore, it does spread the spectrum. The OFDMA system can therefore be considered an MC CDMA system. The above discussion of transmission methods of modulation of the spread spectrum type represents an extremely brief discussion of some of the wireless communication techniques well known in the art.

Data to be transmitted is usually forward error correction (FEC) coded and then packetized, which techniques are well known in the art. Transmission through the network can use a store and forward system, which is well known in the art.

Figure 3:
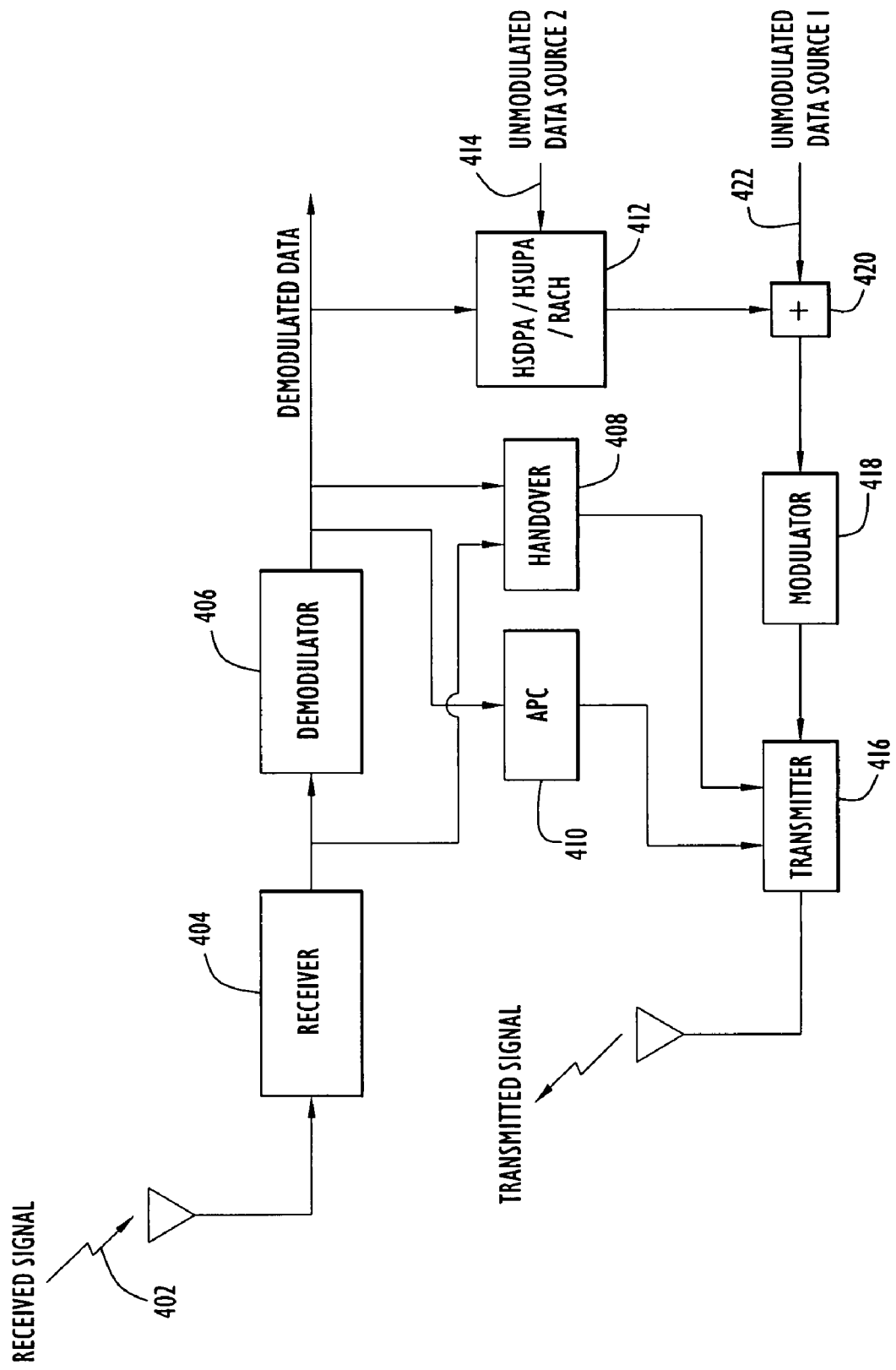
FIG. 3 is a block diagram of a remote subscriber unit transceiver system.

FIG. 3 is a block diagram of a typical RSU transceiver system which is well known in the art. The transceivers used with the present invention are not required to differ from the transceivers described in the IEEE 802 Standards or the 3G PP Standards.

The received signal can be any spread spectrum type signal such as a direct sequence spread spectrum (DSSS) signal (single carrier or multiple carrier), an OFDM (or OFDMA) signal or the like. The design of the transceiver can vary depending on the capability and style desired, and the receivers typically employ MIMO technology so that multiple antennae are used at both the transmitter and receiver. The received signal 402 is supplied to a receiver 404 and can be combined in the MIMO section of the receiver to improve the signal to noise ratio and thereby decrease the error rate. The receiver receives signals from all neighboring nodes, and the signals are supplied to demodulator 406 which has an output supplied to a handover circuit 408, an automatic power control circuit 410 and to an HSDPA (high speed downlink packet access)/HSUPA (high speed uplink packet access)/ RACH (random access channel) circuit 412, the latter also receiving unmodulated data at 414 from a data source 2. Outputs from APC 410 circuit and handover circuit 408 are supplied to a MIMO transmitter 416 which also receives an input from a modulator 418 receiving a summing input from 420 which receives an output from circuit 412 and from an unmodulated data source 1, 422.

The handover system in the remote subscriber unit monitors the received powers of neighboring nodes with the received signal power from the node being communicated with in order to determine if handover to another node is appropriate. The packet of signals from transmitter 416 can vary significantly in size. For example, the packet can be long for video or voice communication or very short for acknowledgement communication. There are, typically, far more acknowledgement signals transmitted than communication packets. To efficiently use channel capacity, it is common to use special packet transmission strategies such as RACH and HSPA (HSUPA/HSDPA) techniques which are described in the IEEE 802 Standards. In practice, the RACH or HSPA protocol is followed to send the data received from data source 2 at 414.

Figure 4:
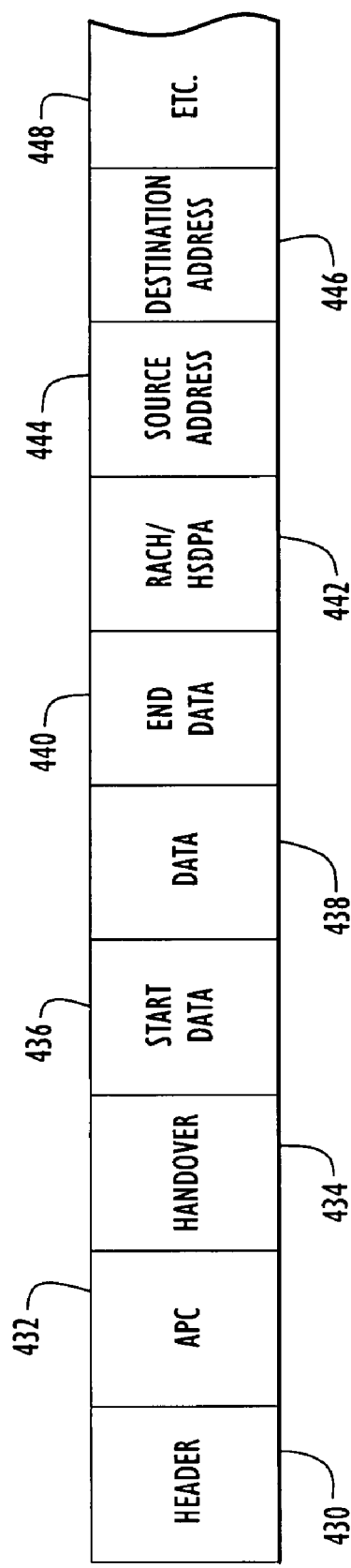
FIG. 4 shows a typical packet of data in block form with the fields/elements in the packet specified by standards for a system in which the packet is to be employed.

A typical signal packet is shown in FIG. 4, it being noted that the packet structure that is actually to be employed is specified in the IEEE 802 Standards and/or the 3G PP Standards. Packet elements utilized in signals for use in the present invention are shown in FIG. 4 for explanation purposes only, since packet arrangements of various types can be utilized with the present invention. The packet shown in FIG. 4 contains a header element 430 to aid in synchronization, an APC element 432, a handover element 434, a start data element 436, a data element 438, an end data element 440, a RACH/HSDPA element 442, a source address element 444, a destination address element 446 and other elements 448 as desired.

Figure 5:
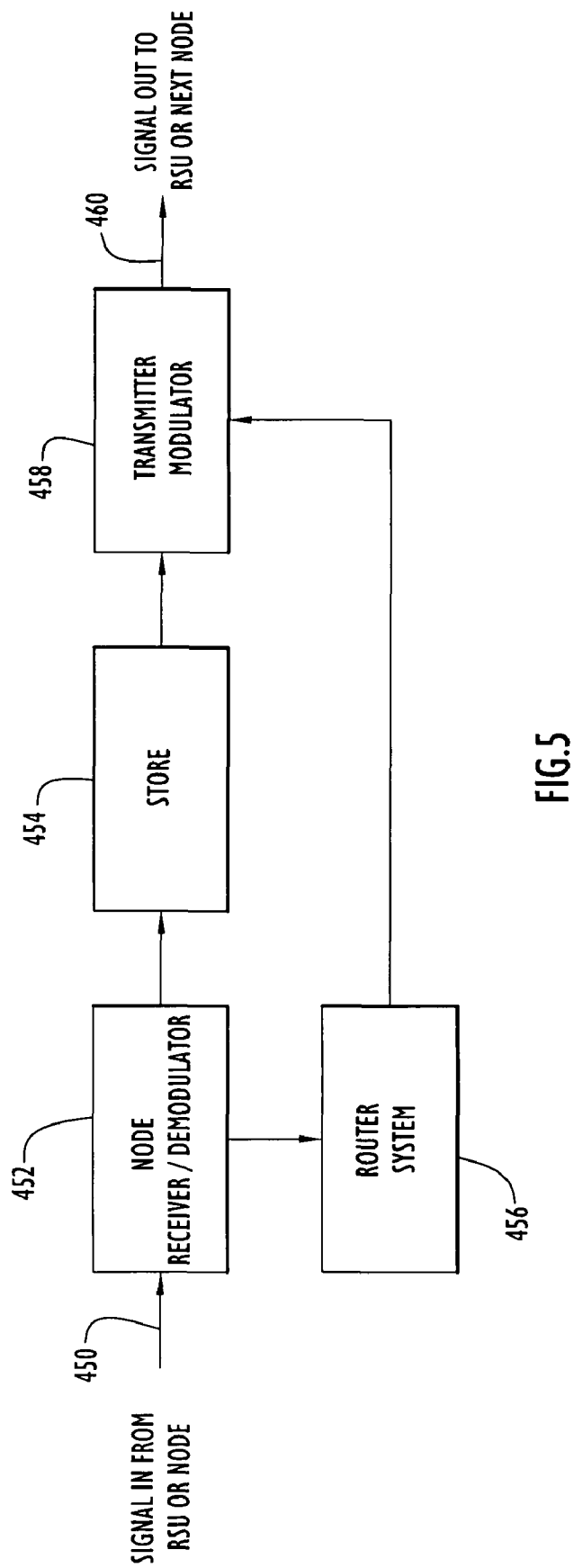
FIG. 5 is a block diagram of store and forward and routing subsystems at a node.

FIG. 5 is a block diagram illustrating the store and forward subsystem of a node as well as the node's routing subsystem. A signal 450 from an RSU or a node is supplied to a node receiver/demodulator 452. In practice, several transmitters/ receivers can be employed simultaneously at a node; however, for purposes of simplification only, a single transceiver is described herein. The signal supplied at 450 can be from a wired or wireless connection. If the signal is from a wireless connection, the signal will typically employ some form of spread spectrum type technology as described above and can also employ MIMO. APC information is sent back to the sender. If the signal is from a wired connection, the signal can be sent at baseband. The received signal/data is supplied from receiver 452 to memory (store) 454 for storage, and the part of the signal packet providing routing information is supplied from receiver 452 to router system 456 which determines, based on the received routing information and the destination address in the packet, to which node to transmit, or whether the packet is to be sent directly to an "attached" RSU. Accordingly, router system 456 has an output supplied to transmitter modulator 458 which also receives an output from memory 454 and supplies an output signal at 460 to a remote subscriber or the next node.

Figure 2:
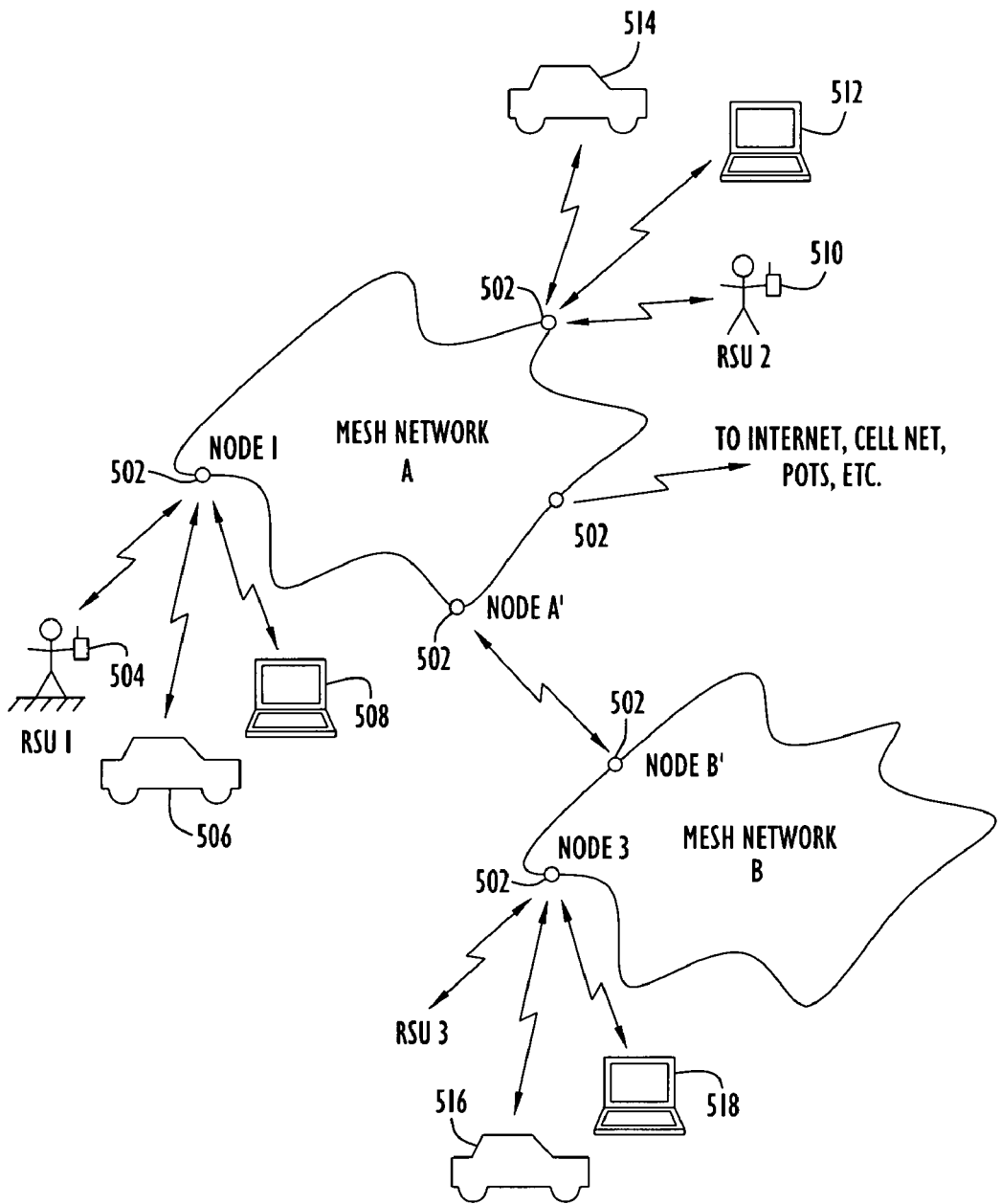
FIG. 2 is a block diagram of a mesh network communication system according to the present invention.
Figure 6:
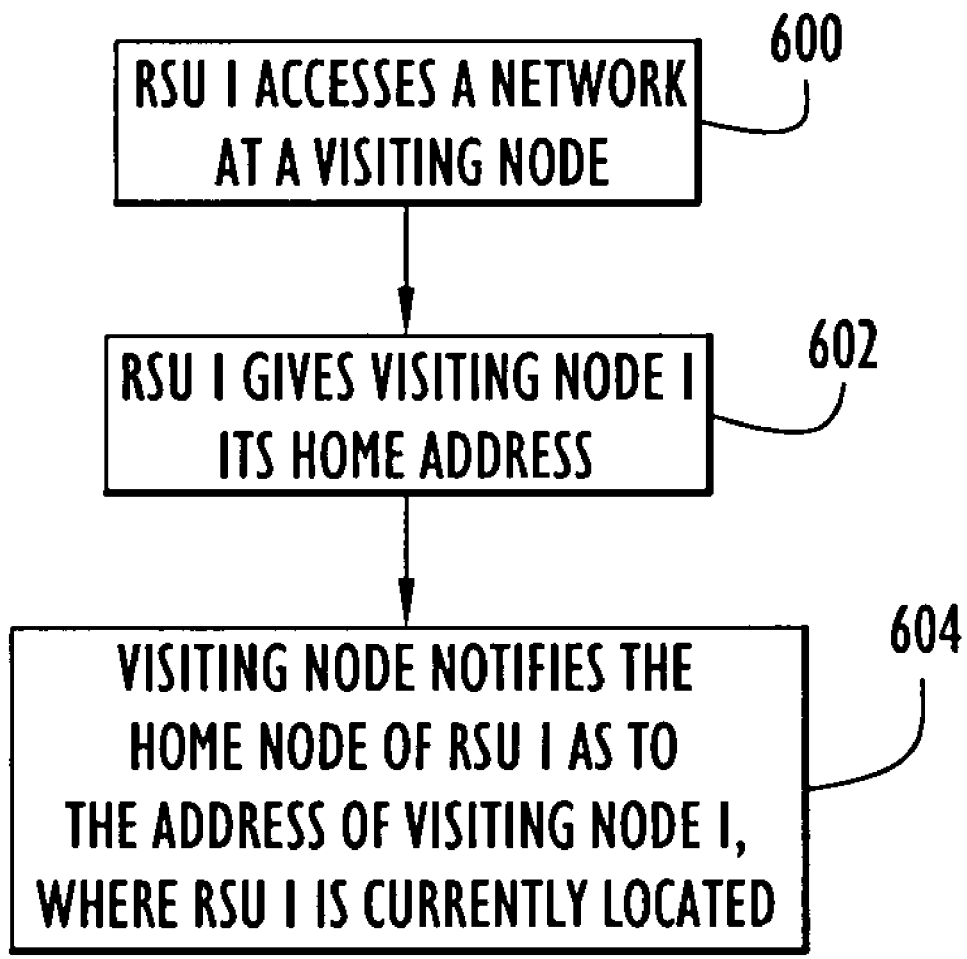
FIGS. 6 and 7 are flowcharts showing a typical sequence of steps of operation of the method and system of the present invention.
Figure 7:
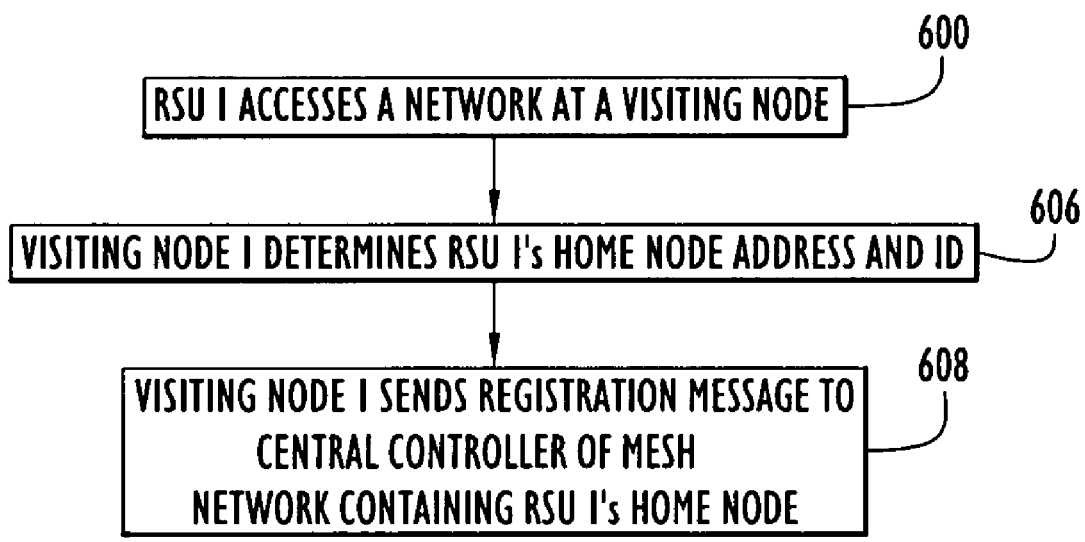

With reference to FIGS. 2, 6 and 7, two methods for notifying the home node of RSU 1 as to the current location of RSU 1 are described. In a first method, the visiting node sends the home node a packet containing the address of the visiting node using a store and forward procedure. In a second method, the visiting node sends a packet containing the current (visiting) address of RSU 1 to a central controller based in mesh network A, which is where RSU 1 is currently located, and the central controller forwards the visiting node's address to the central controller of the network in which the RSU 1 home node is located. The above described methods will be more clearly understood with reference to FIG. 2 wherein RSU 1, which may have a home node in some distant mesh network, has traveled to mesh network A and accesses (visiting) node 1. Other RSUs may be communicating with node 1; however, due to the use of spread spectrum type multiple access communications, RSU 1 504 can also access node 1 simultaneously with the other RSUs. There may be other nodes, not shown, which are in the proximity of node 1; however, node 1 meets the system criteria for access which, in a preferred embodiment, includes adequate, strong received power and sufficient free capacity from node 1 to ensure that RSU 1 can perform whatever operation is required.

After accessing node 1, step 600 in FIG. 6, RSU 1 gives visiting node 1 its home address which is the address of the node where RSU 1 usually connects, step 602. The home node address is analogous to the telephone number of a landline phone and contains the network in which the home node is located. Accordingly, an RSU might indicate that it is calling from mesh network N at address WXYZ, and this address is appended by node 1 to indicate that RSU 1 is currently located in mesh network A at node 1. Preferably, the message relating to the location of RSU 1 is stored and forwarded through mesh network A to whatever other networks are in the path to mesh network N and address WXYZ, step 604. Preferably, this very short ID message is appended to packets containing other messages traveling in the direction of address WXYZ, which may be accomplished by the ID message being removed from its packet at each node receiving the ID message, and appended to the next available packet going in the appropriate direction.

Alternatively, as shown in FIG. 7, after RSU 1 accesses a visiting node 1, step 600, node 1 determines the home node and ID of RSU 1, step 606, and sends a registration message to a central controller in mesh network A which forwards it to the central controller in mesh network N which sends the ID message to address WXYZ, step 608. This procedure is complicated by movement of the RSUs causing continuous changes in visiting nodes therefor and, thus, produces constant traffic to the central controllers. The first method is preferred since extra signal traffic is often reduced.

Figure 8:
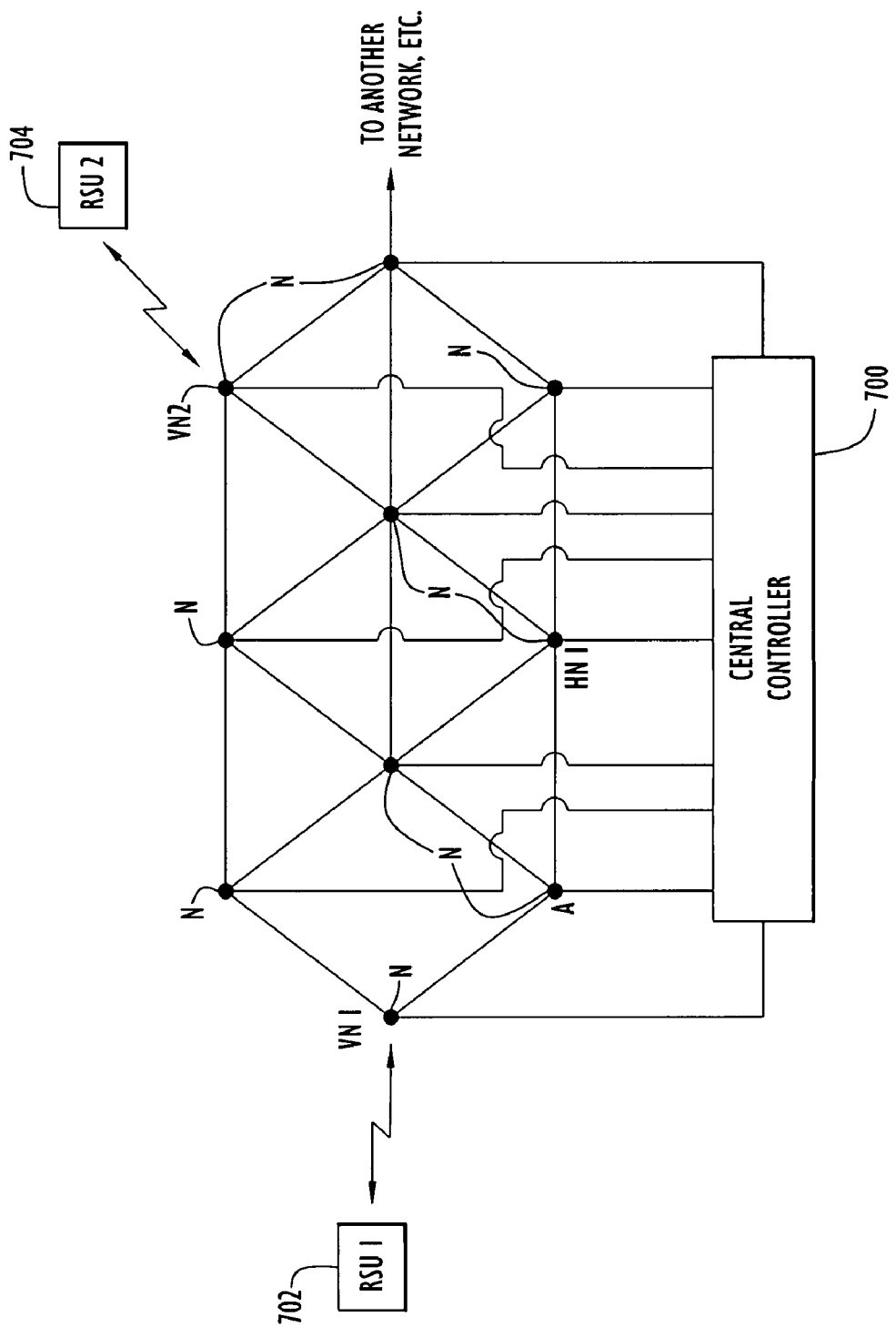
FIG. 8 is a block diagram illustrating use of a central controller with a mesh network.

The use of a central controller is illustrated in FIG. 8 where a central controller 700 is shown in a mesh network formed of nodes N connected either by wires or in a wireless manner. RSU 1, 702, and RSU 2, 704 are coupled with visiting nodes VN1 and VN2, respectively. It will be appreciated that each node N is connected to the central controller 700. The connection can be direct, as shown, or indirect, where, for example, all communications to and from the central controller 700 go through node A, or any other suitable node. In any connection between the nodes and the central controller, bandwidth must be allocated.

During a conversation, the handover procedure allows each mobile RSU to be continually "attached" to some visiting node, and, therefore, the calling RSU to know at all times where RSU 1 is located. When the home node for RSU 1 receives the ID message, it learns the current location of RSU 1. If there is a call for RSU 1 from another RSU in the same, or other, mesh network, the home node for RSU 1 forwards the call to visiting node 1. Communication between RSU 1 and the calling RSU continues using a routing procedure, such as the store and forward procedure, without further involving the home node. It is noted that "routing procedure" includes any method of transmitting a message from a source to a destination of which "store and forward" is only a single example. Alternatively, the home node sends the calling node a message telling the calling node the location of RSU 1 such that the calling RSU now communicates directly with RSU 1.

Figure 9:
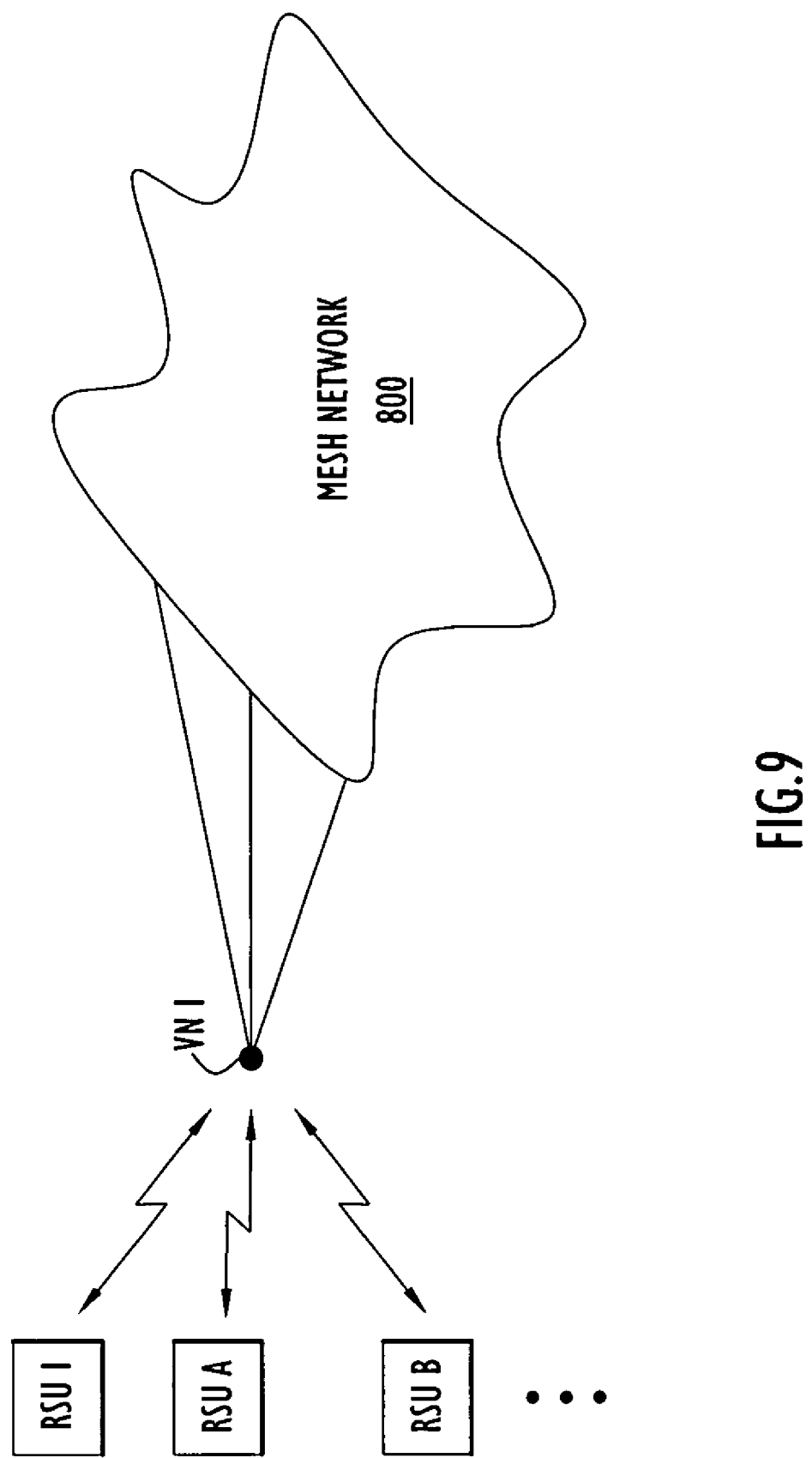
FIG. 9 illustrates multiple users at a visiting node of a mesh network.

FIG. 9 illustrates an RSU 1 and a plurality of other RSUs, RSU A, RSU B, etc., communicating with a mesh network 800, each using a visiting node VN1 as the entrance node. Some of the RSUs may be holding a voice communication with other parties while others might be accessing the Internet or any of the other networks accessible via the mesh network. Still other RSUs can be sending a relatively short packet message to any recipient. Node VN1 has a maximum capacity, that is, it can receive a maximum bit rate from all users of node VN1 at a particular instant of time. If, at any time, an additional user wishes to access the mesh network at VN1, the additional user must not be transmitting with an excessive bit rate so as to cause VN1 to exceed its capacity. Numerous techniques exist to accomplish this task, such as RACH and HSUPA which are described in the 3G PP Standards. Such techniques can be utilized with the system of the present invention if they are deemed to be appropriate. It is important to note that if multiple RSUs are simultaneously communicating with VN 1, automatic power control (APC) can be used. APC techniques are well known and some have been standardized, and any desired technique can be used.

Figure 10:
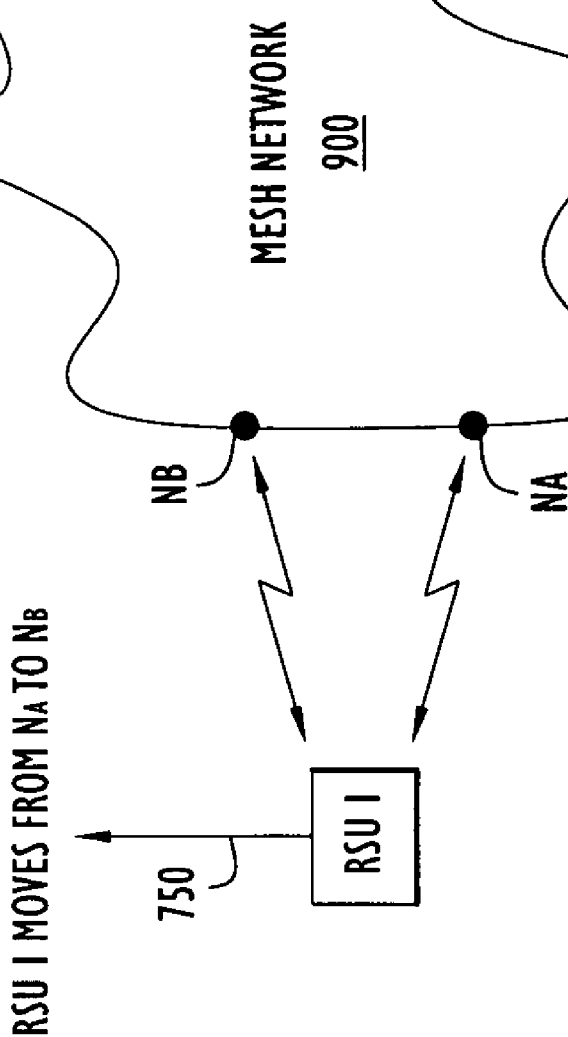
FIG. 10 illustrates handover operation as a remote subscriber unit moves from node to node.

FIG. 10 illustrates the process of "handover". Note that nodes NA and NB are nodes in a mesh network 900 where RSU 1 is accessing the mesh network using node NA but is moving along the line denoted by arrow 750. As RSU 1 moves it will come closer to node NB and further from node NA such that the signal power received at node NA from RSU 1, and received at RSU 1 from node NA, will decrease. Simultaneously, the signal power between RSU 1 and node NB will increase. When the signal power between RSU 1 and node NA decreases sufficiently and the signal power between RSU 1 and node NB increases sufficiently, RSU 1 stops communicating with node NA and commences communication with node NB. This process is referred to conventionally as handover and is conventionally used in cellular communications systems. Handover procedures are well documented in the literature and appear in the various telecommunication standards. As mentioned previously, handover can be utilized in accordance with the system of the present invention.

Figure 11:
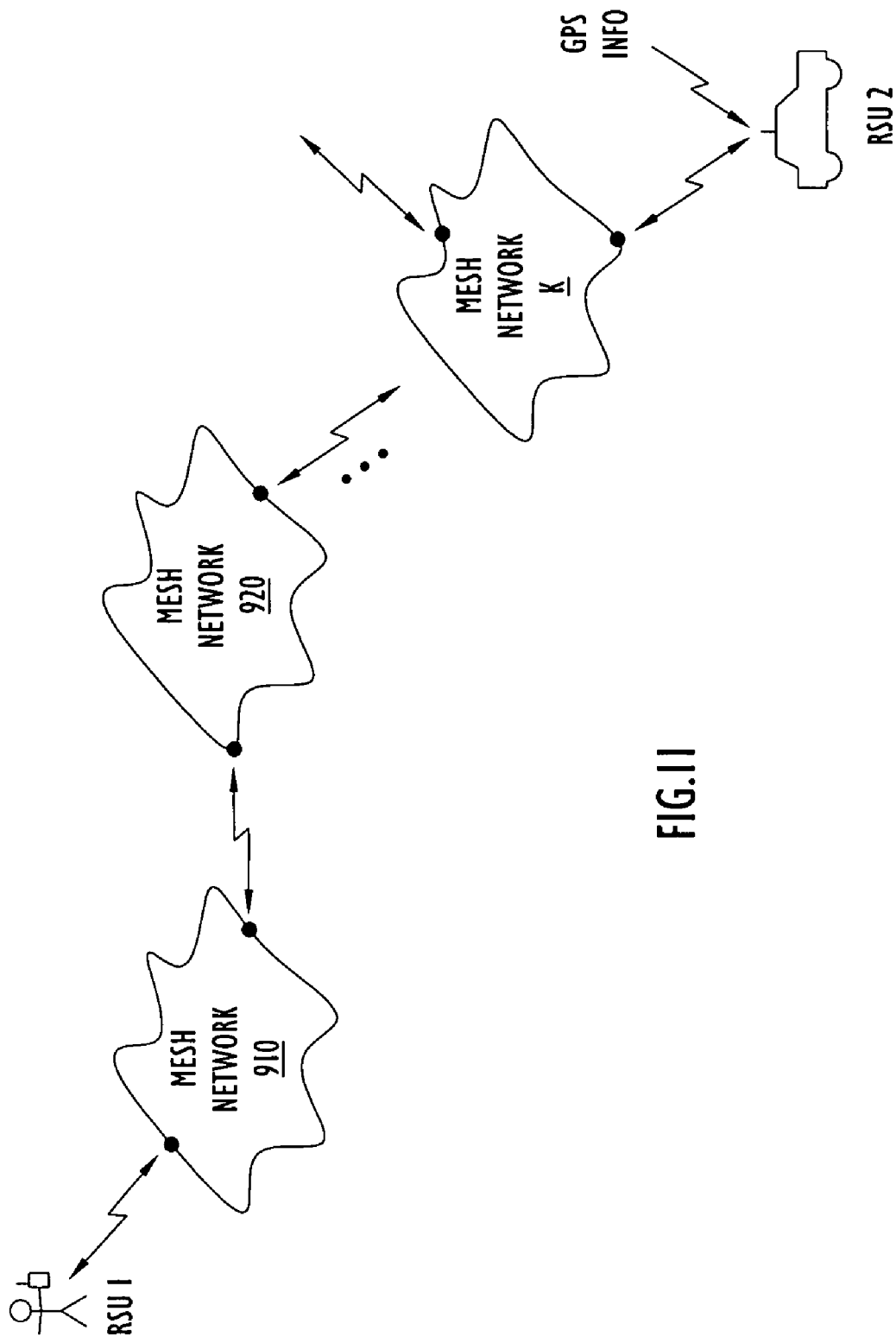
FIG. 11 illustrates the tracking of a remote subscriber unit by another remote subscriber unit as the first remote subscriber unit moves within a system and from mesh network to mesh network incorporating GPS information.

FIG. 11 shows RSU 1 located in mesh network 910 and RSU 2 located in mesh network K. As RSU 2 moves within mesh network K, and from mesh network to mesh network, RSU 1 can track or follow the location of RSU 2 as well as communicate with RSU 2. Note that the above can be assisted by the availability of GPS information supplied to RSU 2; however, such information is not required.

Figure 12:
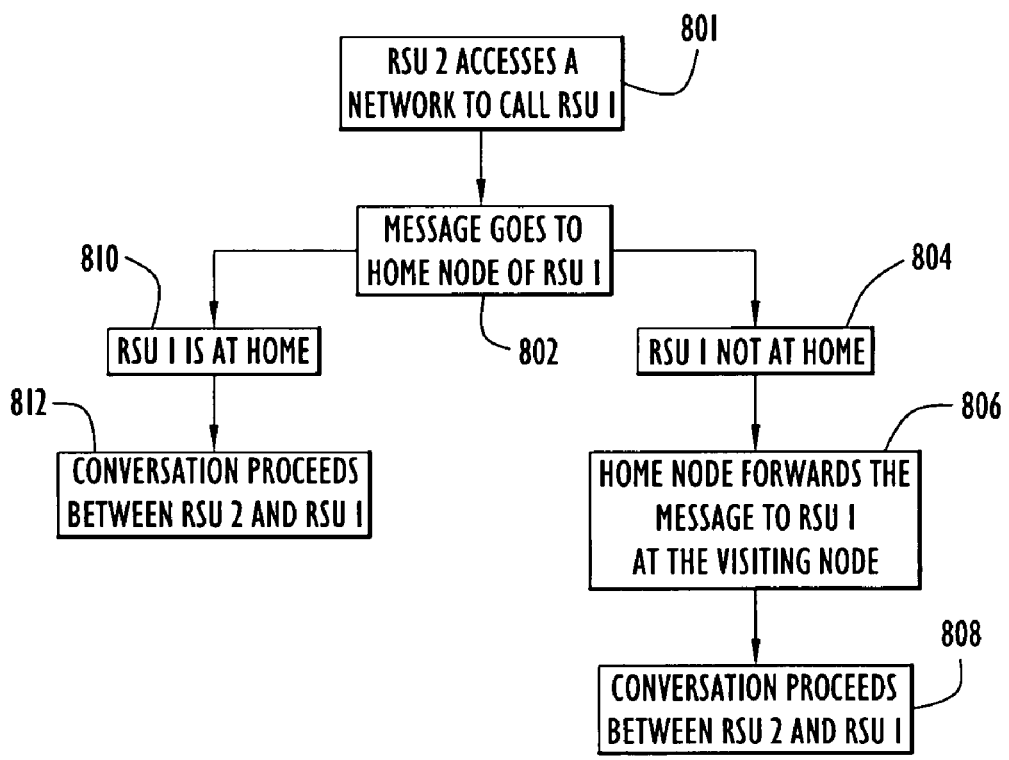
FIG. 12 is a flowchart showing a typical calling procedure in accordance with the method and system of the present invention.
Figure 13:
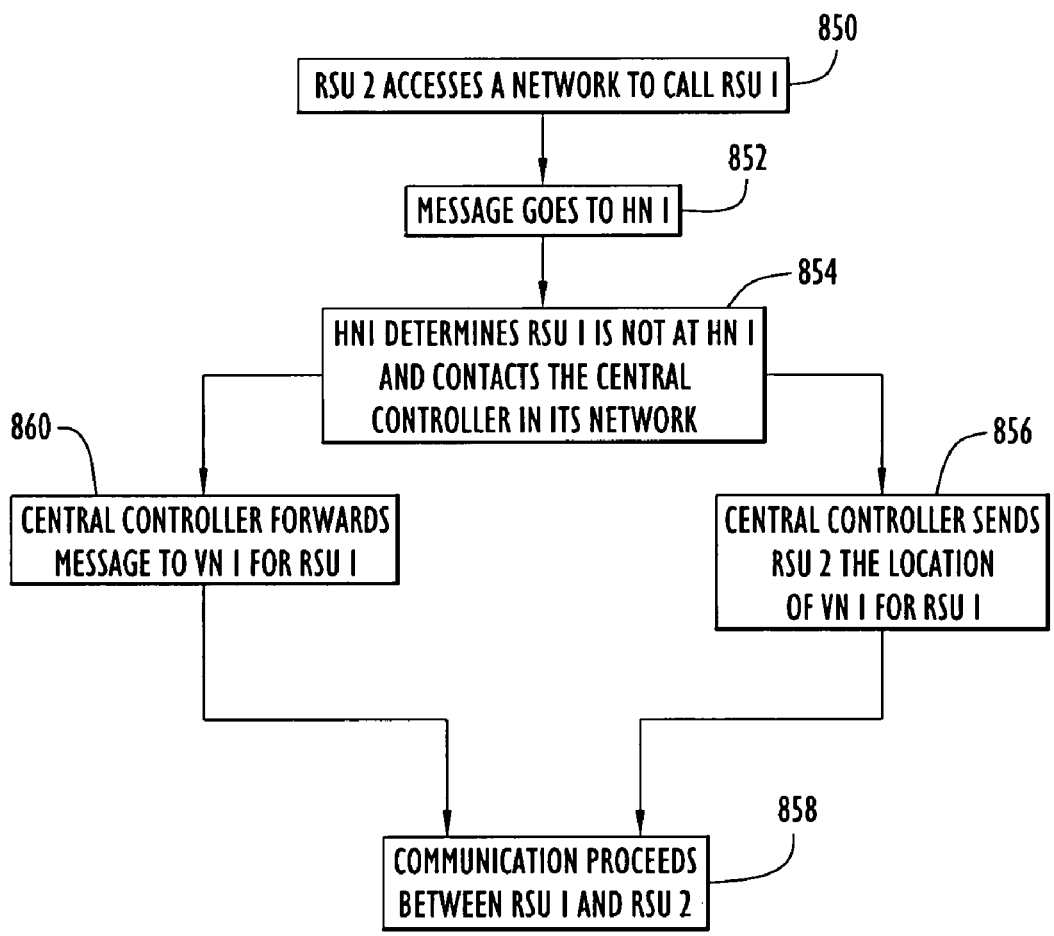
FIG. 13 is a flowchart illustrating notification of a central controller as to the location of a remote subscriber unit in accordance with the method and system of the present invention.

From the above, it should be appreciated that communication between RSUs can be accomplished directly as illustrated in FIGS. 12 and 13, once visiting node and home node information, ID and address, are established. In FIG. 12, RSU 2 accesses a network to call RSU 1, step 801, and sends a message to the home node of RSU 1, step 802. If RSU 1 is not available at its home node, 804, the home node forwards the message to RSU 1 at the visiting node where RSU 1 is currently located since information as to the current location of RSU 1 has been provided to the home node as discussed above. Once the message has been forwarded to the visiting node, 806, conversation proceeds between RSU 2 and RSU 1, 808. In the event RSU 1 is at its home node, 810, conversation between RSU 2 and RSU 1 proceeds directly, 812, without the need for forwarding.

FIG. 13 also illustrates how communication between RSU 1 and RSU 2 can be expedited. In a first step, RSU 2 accesses a network to call RSU 1, 850, and the message goes to the home node, HN 1 for RSU 1, 852. The home node for RSU 1, HN 1, determines that RSU 1 is not at its home node and contacts the central controller in its mesh network, 854. In a first method, the central controller sends RSU 2 the location of the visiting node, VN 1, for RSU 1, 856, and communication proceeds between RSU 1 and RSU 2, 858. Alternatively, in a second method, the central controller forwards the message to visiting node 1 for RSU 1, 860; and, thereafter, communication proceeds between RSU 1 and RSU 2, 858.

It has already been noted that many routing techniques exist. These have been the subject of numerous patents, chapters in texts, technical papers and sections of various standards. One oft used technique, which is used as an example throughout this patent application, is the store and forward system which is commonly employed in communications systems including the Internet and mesh networks. No detailed description thereof is included herein.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. In a mesh network communication system having at least one mesh network and a plurality of nodes in each mesh network, a method of facilitating communication with a remote subscriber unit having a home node in one of the mesh networks comprising the steps of establishing communication between the remote subscriber unit and a visiting node, which is one of the nodes other than the home node, through the use of spread spectrum type modulation;

sending a registration message from the remote subscriber unit to the visiting node identifying the remote subscriber unit;

sending a message from the visiting node to the home node informing the home node of the location of the remote subscriber unit;

informing a calling remote subscriber unit of the address of the visiting node; and establishing communication between the first remote subscriber unit and the calling remote subscriber unit without requiring communication through the home node of the first remote subscriber unit.

2. The method of claim 1 wherein said step of sending a message from the visiting node to the home node includes routing the message via the nodes using traffic information.

3. The method of claim 1 and further comprising the step of using handover as the remote subscriber unit moves from node to node within a mesh network and/or from mesh network to mesh network.

4. The method of claim 1 and further comprising the step of maintaining signal power received at any node from remote subscriber units communicating to that node substantially constant using automatic power control.

5. The method of claim 1 wherein said step of sending a message from the visiting node to the home node includes using a central controller.

6. The method of claim 1 wherein said step of sending a message from the visiting node to the home node includes using store and forward routing.

7. The method of claim 1 and further comprising the step of the visiting node receiving a message from a second remote subscriber unit and forwarding the message to the first remote subscriber unit.

8. In a mesh network communication system having at least one mesh network and a plurality of nodes in each mesh network, a method of facilitating communicate n with a remote subscriber unit having a home node in one of the mesh networks comprising the steps of establishing communication between the remote subscriber unit and a visiting node, which is one of the nodes other than the home node, through the use of spread spectrum type modulation;

sending a registration message from the remote subscriber unit to the visiting node identifying the remote subscriber unit;

sending a message from the visiting node to the home node informing the home node of the location of the remote subscriber unit;

the visiting node receiving a message from a second remote subscriber unit and forwarding the message to the first remote subscriber unit; and the visiting node determining that the first remote subscriber unit no longer resides at the visiting node due to handoff of the first remote subscriber unit to another node and the visiting node forwarding the message to a second visiting node where the first remote subscriber unit now resides.

9. The method of claim 8 wherein said step of sending a message from the visiting node to the home node includes routing the message via the nodes using traffic information.

10. The method of claim 8 and further comprising the step of using handover as the remote subscriber unit moves from node to node within a mesh network and/or from mesh network to mesh network.

11. The method of claim 8 and further comprising the step of maintaining signal power received at any node from remote subscriber units communicating to that node substantially constant using automatic power control.

12. The method of claim 8 wherein said step of sending a message from the visiting node to the home node includes using a central controller.

13. The method of claim 8 wherein said step of sending a message from the visiting node to the home node includes using store and forward routing.

14. A mesh network communication system comprising one or more mesh networks, each of said mesh networks having a plurality of nodes;

a plurality of remote subscriber units capable of accessing said nodes using spread spectrum type signals, said remote subscriber units each having a home node located in one of said mesh networks;

a first one of said remote subscriber units being located remotely from its home node and closer to a visiting node than to its home node, said first remote subscriber unit sending a registration message to said visiting node including signals identifying said first remote subscriber unit;

a second remote subscriber unit being located in one of said mesh networks and being capable of sending a first message to said first remote subscriber unit by sending said first message to the home node of said first remote subscriber unit;

said visiting node being capable of sending said registration message to the home node of said first remote subscriber unit;

the home node for said first remote subscriber unit being capable of sending said first message to said visiting node; and said visiting node being capable of sending said first message to said first remote subscriber unit whereby further messages between said first and second remote subscriber units can be sent without using the home node of said first remote subscriber unit.

15. The system of claim 14 wherein said home node is capable of sending an ID packet signal to said second remote subscriber unit including information locating said first remote subscriber unit.

16. The system of claim 14 wherein said mesh networks include a central controller, said visiting node sending said registration message to said central controller and said central controller sending said registration message to said home node.

17. A mesh network system comprising one or more mesh networks including a central controller, each of said mesh networks having a plurality of nodes;

a plurality of remote subscriber units capable of accessing said nodes using spread spectrum type signals, said remote subscriber units each having a home node located in one of said mesh networks;

a first one of said remote subscriber units being located remotely from its home node and closer to a visiting node than to its home node, said first remote subscriber unit sending a registration message to said visiting node including signals identifying said first remote subscriber unit;

a second remote subscriber unit being located in one of said mesh networks and being capable of sending a first message to said first remote subscriber unit by sending the first message including the address of said second remote subscriber unit to the home node of said first remote subscriber unit, said visiting node of said first subscriber unit being capable of sending said registration message to the home node of said first remote subscriber unit, the home node for said first remote subscriber unit being capable of sending the address of the visiting node of said first remote subscriber to its central controller, the first message being sent to the central controller of the home node for said first remote subscriber unit, said central controller sending the first message to said visiting node; and said visiting node being capable of sending the first message to said first remote subscriber unit whereby further messages between said first and second remote subscriber units can be sent without using the home node of said first remote subscriber unit.

18. A mesh network system comprising one or more mesh networks including a central controller, each of said mesh networks having a plurality of nodes;

a plurality of remote subscriber units capable of accessing said nodes using spread spectrum type signals, said remote subscriber units each having a home node located in one of said mesh networks;

a first one of said remote subscriber units being located remotely from its home node and closer to a visiting node than to its home node, said first remote subscriber unit sending a first registration message to said visiting node including signals identifying said first remote subscriber unit;

said visiting node being capable of sending a second registration message to said central controller for said visiting node, said second registration method including signals identifying said visiting node;

a second remote subscriber unit being located in one of said mesh networks and being capable of sending a first message to said first remote subscriber unit by sending the first message including the address of said second remote subscriber unit to the home node of said first remote subscriber unit, the home node being capable of sending said first message to said central controller when said first remote subscriber unit is not at said home node; and said visiting node of said first subscriber unit being capable of sending said registration message to the home node of said first remote subscriber unit.

* * * * *